United States Patent
Kurihara et al.

(10) Patent No.: US 8,824,126 B2
(45) Date of Patent: Sep. 2, 2014

(54) CASING, ELECTRONIC APPARATUS, AND METHOD AND MACHINE FOR FORMING CASING

(75) Inventors: Toru Kurihara, Kawasaki (JP);
Masayuki Sato, Kawasaki (JP); Yutaka Kawahigashi, Kawasaki (JP); Kazuhiro Kakuguchi, Kawasaki (JP); Nozomu Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 12/975,940

(22) Filed: Dec. 22, 2010

(65) Prior Publication Data

US 2011/0157797 A1 Jun. 30, 2011

(30) Foreign Application Priority Data

Dec. 24, 2009 (JP) ................................. 2009-292485

(51) Int. Cl.
*H05K 5/00* (2006.01)
*H04M 1/00* (2006.01)
*H04B 1/38* (2006.01)
*B65D 85/38* (2006.01)
*B65D 85/00* (2006.01)

(52) U.S. Cl.
USPC ............... 361/679.01; 455/575.1; 455/575.8; 455/90.3; 206/305; 206/320

(58) Field of Classification Search
USPC ............ 361/679.01–679.45, 679.55–679.59; 455/575.1, 90.1–90.3, 575.3–575.8; 345/156, 157, 168, 169, 905; 312/223.1, 223.2; 264/328.1; 200/302.1; 206/305, 320
See application file for complete search history.

(56) References Cited

U.S. PATENT DOCUMENTS

| | | | |
|---|---|---|---|
| 6,462,265 B1 | 10/2002 | Sasaoka et al. | |
| 7,436,653 B2 * | 10/2008 | Yang et al. | 361/679.01 |
| 7,941,196 B2 * | 5/2011 | Kawasaki et al. | 455/575.8 |
| 2007/0189120 A1 * | 8/2007 | Yang et al. | 367/131 |
| 2008/0068292 A1 * | 3/2008 | Yuan et al. | 345/2.1 |
| 2008/0081679 A1 * | 4/2008 | Kawasaki et al. | 455/575.8 |
| 2009/0215412 A1 * | 8/2009 | Liu et al. | 455/90.3 |
| 2009/0256364 A1 * | 10/2009 | Gadau et al. | 292/128 |

FOREIGN PATENT DOCUMENTS

| | | |
|---|---|---|
| JP | 6-020301 Y2 | 5/1994 |
| JP | 6-60027 U | 8/1994 |
| JP | 8-1680 A | 1/1996 |
| JP | 9-083004 A | 3/1997 |
| JP | 9-246772 A | 9/1997 |
| JP | 2006-275084 A | 10/2006 |

OTHER PUBLICATIONS

Japanese Office Action dated Jul. 23, 2013, issued in corresponding Japanese Patent Application No. 2009-292485, w/ English translation.
Japanese Office Action dated Apr. 1, 2014, issued in Japanese Patent Application No. 2009-292485, w/English translation (7 pages).

* cited by examiner

*Primary Examiner* — Nidhi Desai
(74) *Attorney, Agent, or Firm* — Westerman, Hattori, Daniels & Adrian, LLP

(57) ABSTRACT

A casing includes a first casing and a second casing that sandwich an elastic member, wherein the first casing includes a pressed portion that is pressed by the elastic member, and an engaging portion adjacent to the pressed portion that has a flange protruding toward the pressed portion that engages with the second casing, and the pressed portion is flat in a region corresponding to at least the engaging portion.

3 Claims, 10 Drawing Sheets

FIG. 1A
FIG. 1B
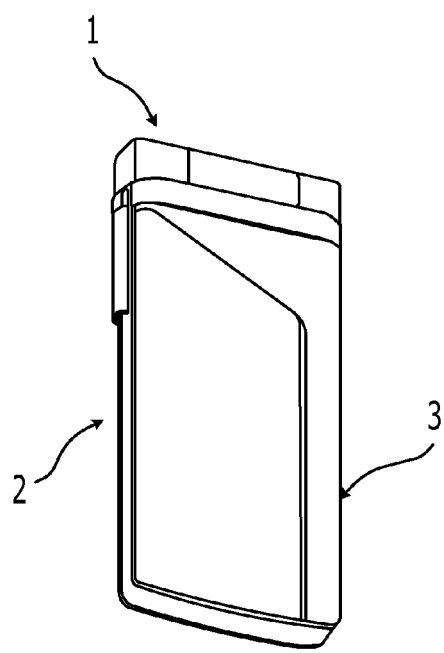
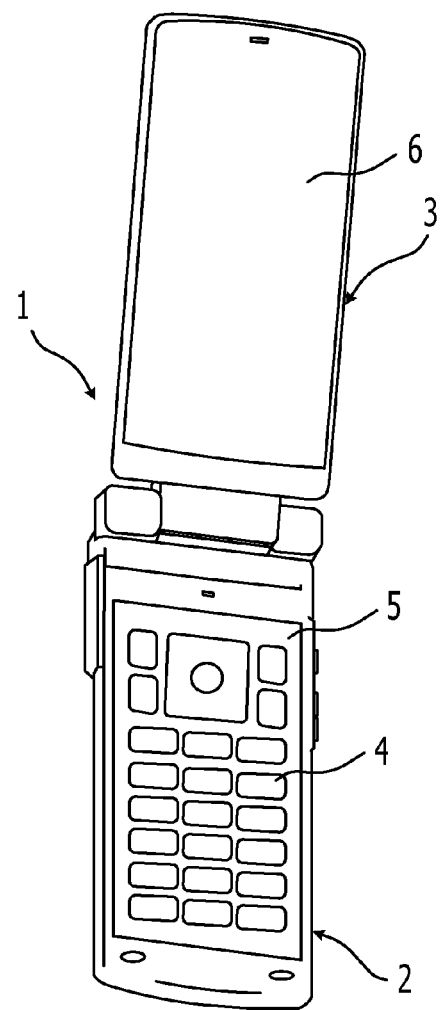

US 8,824,126 B2

CASING, ELECTRONIC APPARATUS, AND METHOD AND MACHINE FOR FORMING CASING

CROSS-REFERENCE TO RELATED APPLICATIONS

This application is based upon and claims the benefit of priority from the prior Japanese Patent Application No. 2009-292485 filed on Dec. 24, 2009, the entire contents of which are incorporated herein by reference.

FIELD

The present embodiment relates to a casing, an electronic apparatus, and a method and a machine for forming the casing.

BACKGROUND

A known technique assembles two members by engaging the two members with each other. Japanese Unexamined Patent Application Publication No. 9-83004 discloses a technique that assembles a cover and a box. Japanese Examined Utility Model Registration Application Publication No. 6-20301 discloses a technique that assembles a plug and a receptacle. Also, a known technique includes an elastic member pinched between first and second casings when the first and second casings are assembled to each other, to inhibit water from entering the space defined by the first and second casings. The first casing includes a pressed portion that is pressed by the elastic member.

SUMMARY

According to an aspect of an embodiment, a casing includes a first casing and a second casing that sandwich an elastic member. The first casing includes a pressed portion that is pressed by the elastic member, and an engaging portion, adjacent to the pressed portion, that has a flange protruding toward the pressed portion that engages with the second casing. The pressed portion is flat in a region corresponding to at least the engaging portion.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

BRIEF DESCRIPTION OF THE DRAWINGS

FIGS. 1A and 1B are explanatory views of a cellular phone.

DETAILED DESCRIPTION OF THE EMBODIMENTS

Figure 2A:
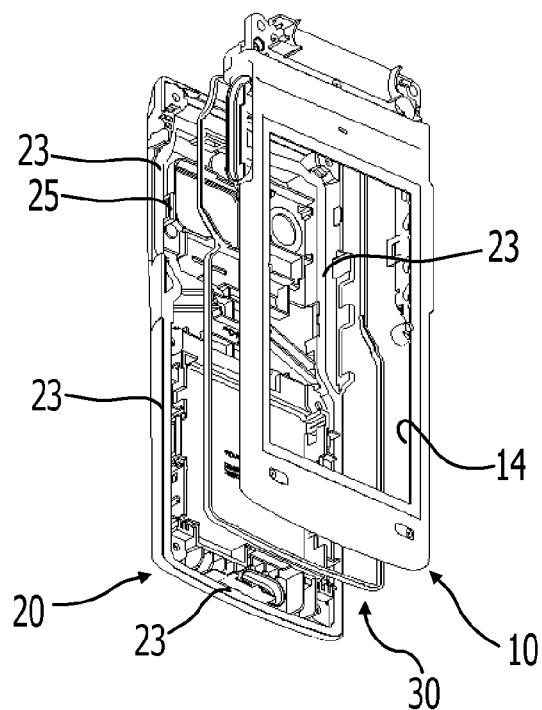
FIGS. 2A and 2B are exploded perspective views of casings for a body section.

An exemplary embodiment of casings that are employed for a cellular phone will be described. The cellular phone is an example of an electronic apparatus. FIGS. 1A and 1B are explanatory views of a cellular phone 1. The cellular phone 1 includes a body section 2 and a display section 3 that are coupled to each other by a hinge so that the body section 2 and the display section 3 are openable and closable. FIG. 1A illustrates the cellular phone 1 in a closed state. FIG. 1B illustrates the cellular phone 1 in an open state. The body section 2 includes a plurality of operation keys 4. The display section 3 includes a display 6 that may display a desirable image in response to an operation instruction from the operation keys 4. A panel 5 holds the operation keys 4 and is attached to the body section 2. The body section 2 is an example of a first apparatus-configuring section that configures part of the cellular phone 1. The display section 3 is an example of a second apparatus-configuring section that configures part of the cellular phone 1.

Figure 2B:
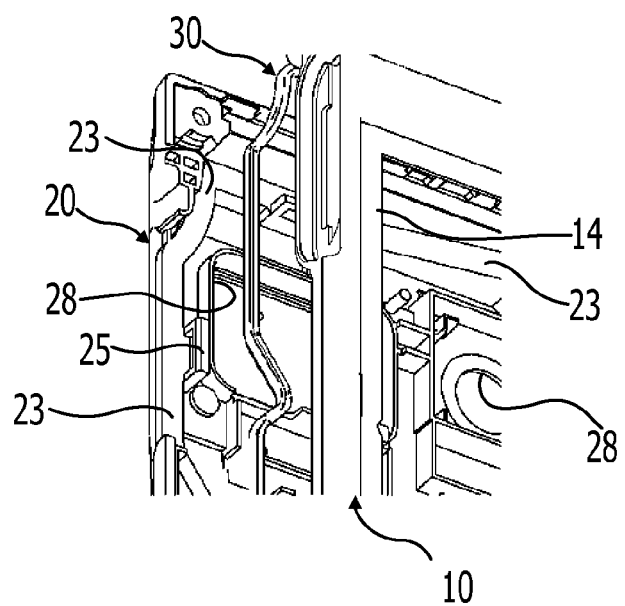

FIGS. 2A and 2B are exploded perspective views of casings for the body section 2. The casings for the body section 2 include a front case 10, a rear case 20, and an elastic member 30 that is pinched between the front case 10 and the rear case 20. The front case 10 is an example of a second casing. The rear case 20 is an example of a first casing. When the body section 2 and the display section 3 are closed, the display section 3 hides the upper surface of the front case 10. FIGS. 2A and 2B illustrate a state in which an electronic component, which is housed in a housing space defined cooperatively by the front case 10 and the rear case 20, is removed.

The front case 10 and the rear case 20 are made of synthetic resin. The front case 10 has a substantially rectangular opening 14. The panel 5 is attached to the opening 14. The elastic member 30 is made of rubber and is a continuous loop. The elastic member 30 is pinched between circumferential edge portions of the front case 10 and the rear case 20. The circumferential edge portion of the rear case 20 includes a pressed portion 23 that is pressed by the elastic member 30 when the elastic member 30 is pinched between the front case 10 and the rear case 20.

FIG. 2B is a partly enlarged view of FIG. 2A. The rear case 20 includes an engaging portion 25. The engaging portion 25 is adjacent to the pressed portion 23. The engaging portion 25 may engage with the front case 10. The engaging portion 25 has a claw-like shape. The engaging portion 25 is formed on the inner side of the pressed portion 23. Referring to FIG. 2B, the rear case 20 has a plurality of openings 28. A camera unit and a port for an infrared communication are located in one of openings 28 and a flash light for the camera unit is located in another of openings 28.

Figure 3A:
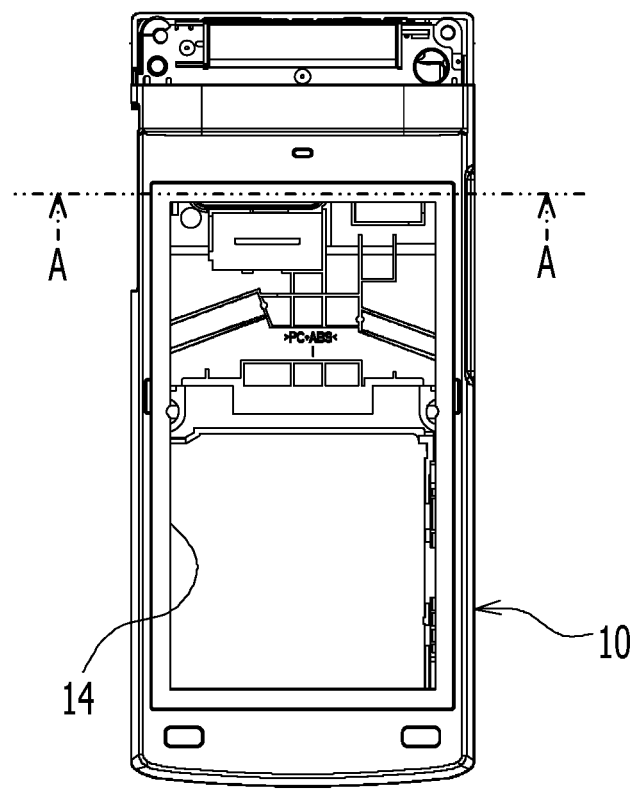
FIGS. 3A and 3B illustrate an assembled state of a front case, a rear case, and an elastic member.
Figure 3B:
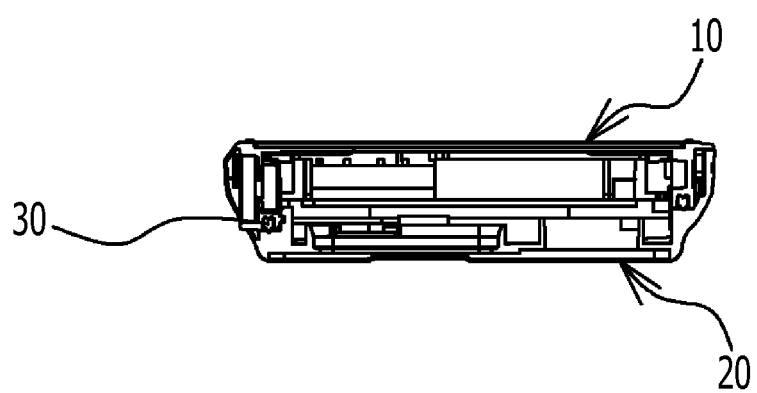
Figure 4:
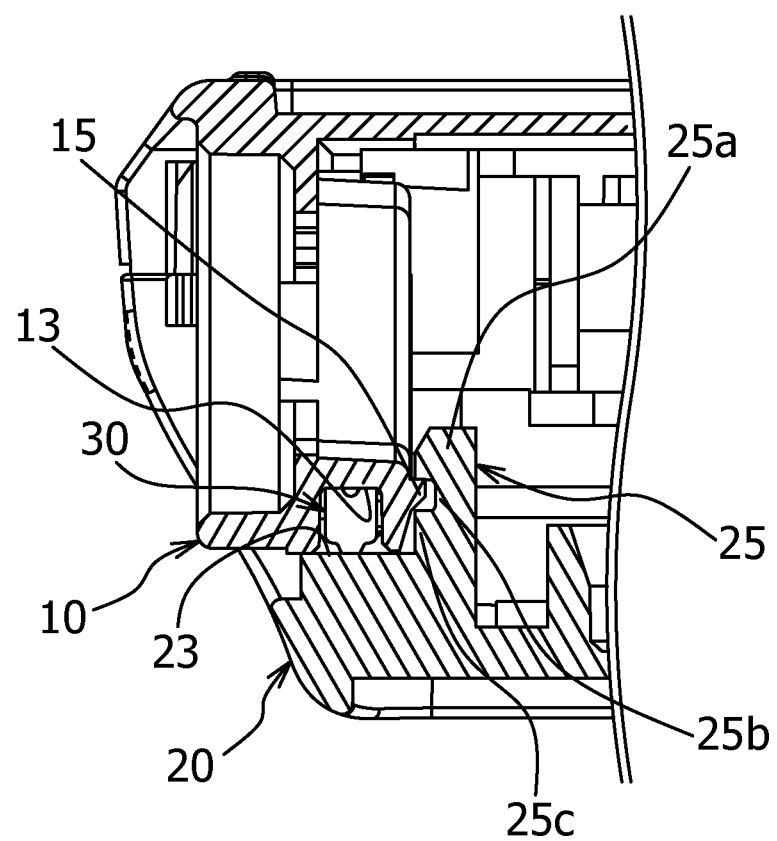
FIG. 4 is a partly enlarged view of FIG. 3B.

FIGS. 3A and 3B illustrate an assembled state of the front case 10, the rear case 20, and the elastic member 30. FIG. 3B is a cross-sectional view taken along line A-A in FIG. 3A. FIG. 4 is a partly enlarged view of FIG. 3B. FIG. 4 illustrates an area around the elastic member 30. The front case 10 has a recessed portion 13 that holds the elastic member 30. The recessed portion 13 extends along the circumferential edge of the elastic member 30. The front case 10 has an interlocking portion 15. The engaging portion 25 engages with the interlocking portion 15, resulting in the recessed portion 13 and the pressed portion 23 pinching the elastic member 30. The recessed portion 13 and the pressed portion 23 press the elastic member 30. Hence, the elastic member 30 presses the recessed portion 13 and the pressed portion 23. The front case 10 and the rear case 20 pinch the elastic member 30 with pressure, so that the elastic member 30 inhibits water from entering the space defined by the front case 10 and the rear case 20.

Figure 5:
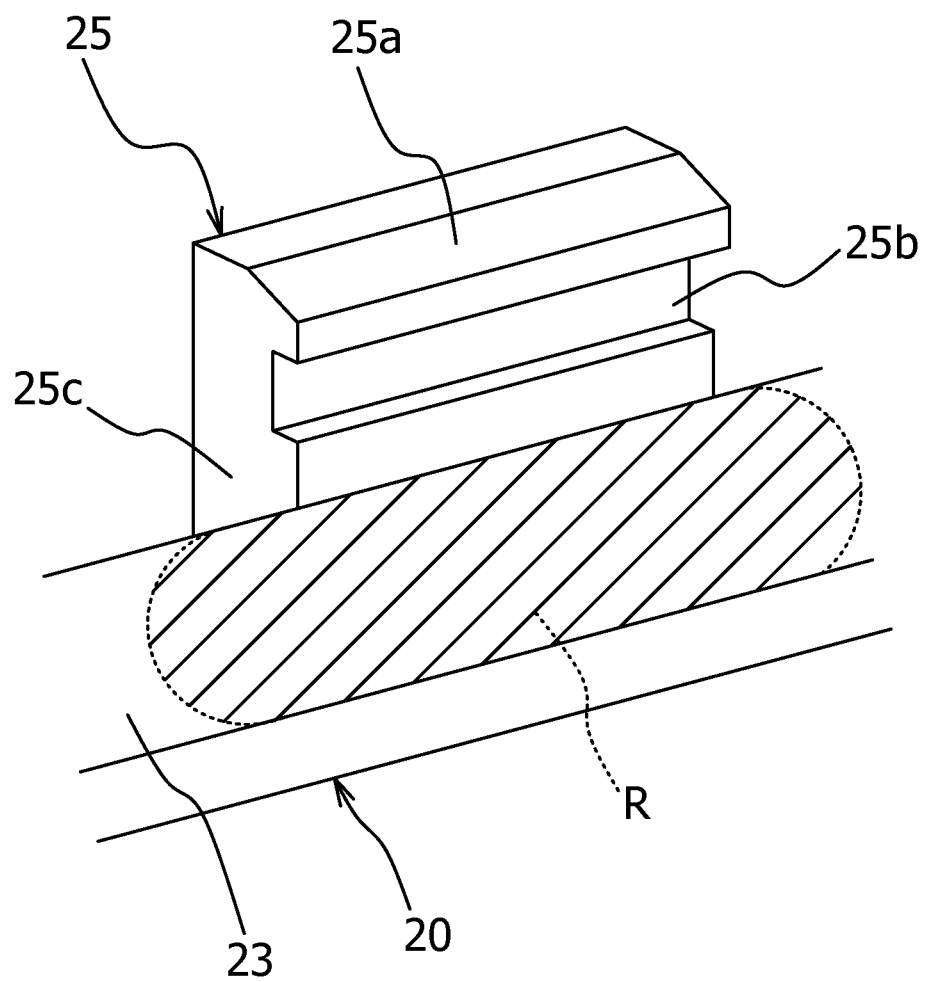
FIG. 5 is a schematic view of an engaging portion.

Next, the engaging portion 25 will be described in detail. FIG. 5 is a schematic view of the engaging portion 25. Referring to FIGS. 4 and 5, the engaging portion 25 includes a flange 25a, a neck 25b, and a base 25c. The flange 25a is formed at a distal end of the engaging portion 25 and protrudes toward the pressed portion 23. The neck 25b continuously extends from the flange 25a. The base 25c continuously extends from the neck 25b and is adjacent to the pressed portion 23. The base 25c has a larger thickness than the neck 25b.

Referring to FIG. 5, a region R spreading on the pressed portion 23 and corresponding to at least the engaging portion 25 is flat. In other words, part of the pressed portion 23 located near the engaging portion 25 is flat. If the pressed portion 23 has a step, the step may provide a gap between the elastic member 30 and the pressed portion 23. Water may enter the space defined by the front case 10 and the rear case 20 through the gap. In contrast, since the pressed portion 23 is flat as illustrated in FIG. 5, no gap is provided between the elastic member 30 and the pressed portion 23. Thus, waterproofness is increased.

Also, the base 25c has the larger thickness than the neck 25b. Accordingly, durability of the engaging portion 25 is increased. To provide reliable contact between the pressed portion 23 and the elastic member 30, the elastic member 30 desirably has a large elastic repulsive force. However, since the engaging portion 25 engages with the engaged portion 15 of the front case 10 against the elastic repulsive force of the elastic member 30, if the elastic member 30 has the large elastic repulsive force, a large load may be exerted on the engaging portion 25. Since the base 25c is thicker than the neck 25b, the durability of the engaging portion 25 may be ensured even if the large load is exerted on the engaging portion 25.

Figure 6:
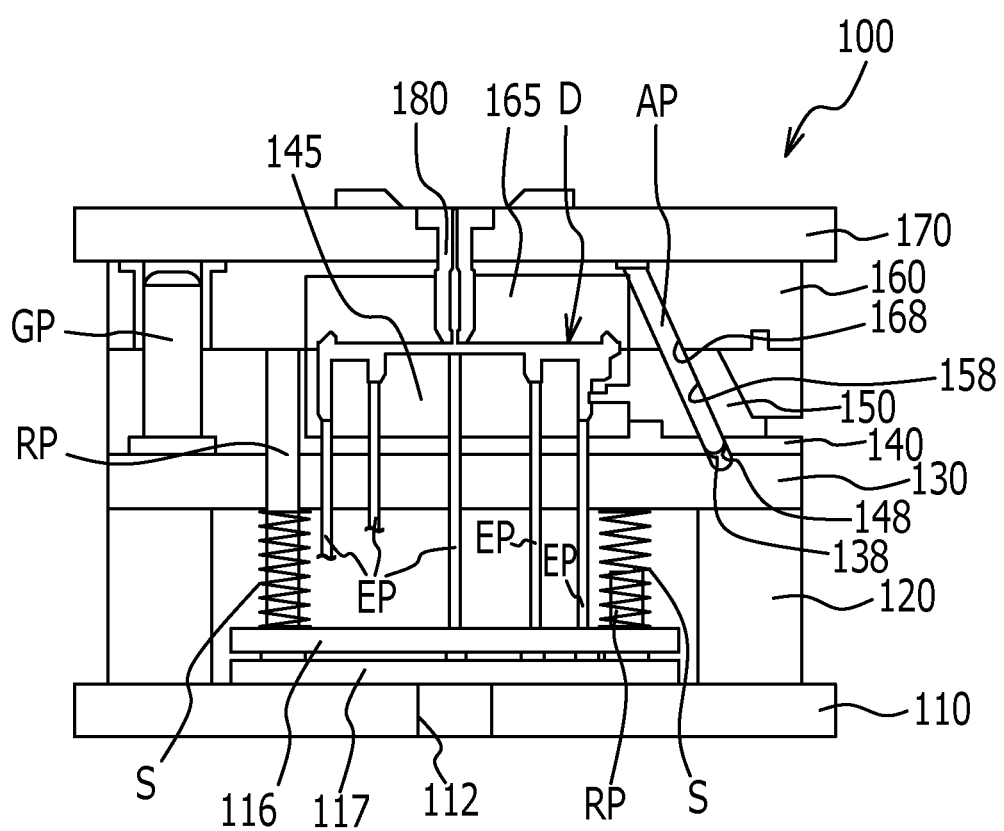
FIG. 6 is an explanatory view of an injection molding machine for forming the rear case.

Next, a method for forming the rear case 20 will be described. FIG. 6 is an explanatory view of an injection molding machine 100 for forming the rear case 20. The injection molding machine 100 includes a core adopter plate 110, a spacer block 120, a support plate 130, a core plate 140, a slide core 150, a cavity plate 160, a cavity adopter plate 170, and a sprue bush 180. FIG. 6 illustrates a closed state of the injection molding machine 100. The core plate 140 is provided with a core insert 145. The cavity plate 160 is provided with a cavity insert 165. In the closed state in which the core plate 140 is in contact with the cavity plate 160, the space defined by the core insert 145 and the cavity insert 165 is filled with molten resin, and hence a molded part D is formed. The molded part D is the rear case 20. The space defined by the core insert 145 and the cavity insert 165 is filled with the molten resin through the sprue bush 180.

Ejector pins EP knock out the molded part D from the core plate 140 side after the molded part D is molded and the core plate 140 and the cavity plate 160 are opened. Proximal end portions of the ejector pins EP are pinched and held by a first ejector plate 116 and a second ejector plate 117. The first ejector plate 116 and the second ejector plate 117 are urged by springs S that are arranged between the support plate 130 and the first ejector plate 116. Return pins RP are inserted through the springs S. Proximal end portions of the return pins RP are pinched and held by the first ejector plate 116 and the second ejector plate 117. The core adopter plate 110 has an ejector hole 112. Part of the second ejector plate 117 is exposed through the ejector hole 112.

After the cavity plate 160 and the core plate 140 are opened, if a rod (not illustrated) pushes the second ejector plate 117 through the ejector hole 112 against the urging forces of the springs S, the ejector pins EP knock out the molded part D. If the rod is retracted from the second ejector plate 117, the first ejector plate 116 and the second ejector plate 117 return to original positions by the urging forces of the springs S. The ejector pins EP also return to original positions accordingly. A guide pin GP guides a direction of relative movement between the cavity plate 160 and the core plate 140.

An angular pin AP is coupled to the cavity plate 160. In particular, the angular pin AP is coupled to the cavity plate 160 in an inclined posture with respect to an open/close direction of the core plate 140 and the cavity plate 160. The cavity plate 160 has a hole 168. The angular pin AP penetrates through the hole 168. The cavity insert 165 is fixed to the cavity plate 160. The core plate 140 is provided with the slide core 150. The slide core 150 has a hole 158. The angular pin AP may be inserted into the hole 158. The core plate 140 and the support plate 130 also have holes 148 and 138. The angular pin AP may be inserted into the holes 148 and 138. Referring to FIG. 6, when the injection molding machine 100 is closed, the angular pin AP is inserted into the hole 158 and the like, and the slide core 150 is in contact with the core insert 145. The slide core 150 defines the molded part D in cooperation with the core insert 145.

Figure 7:
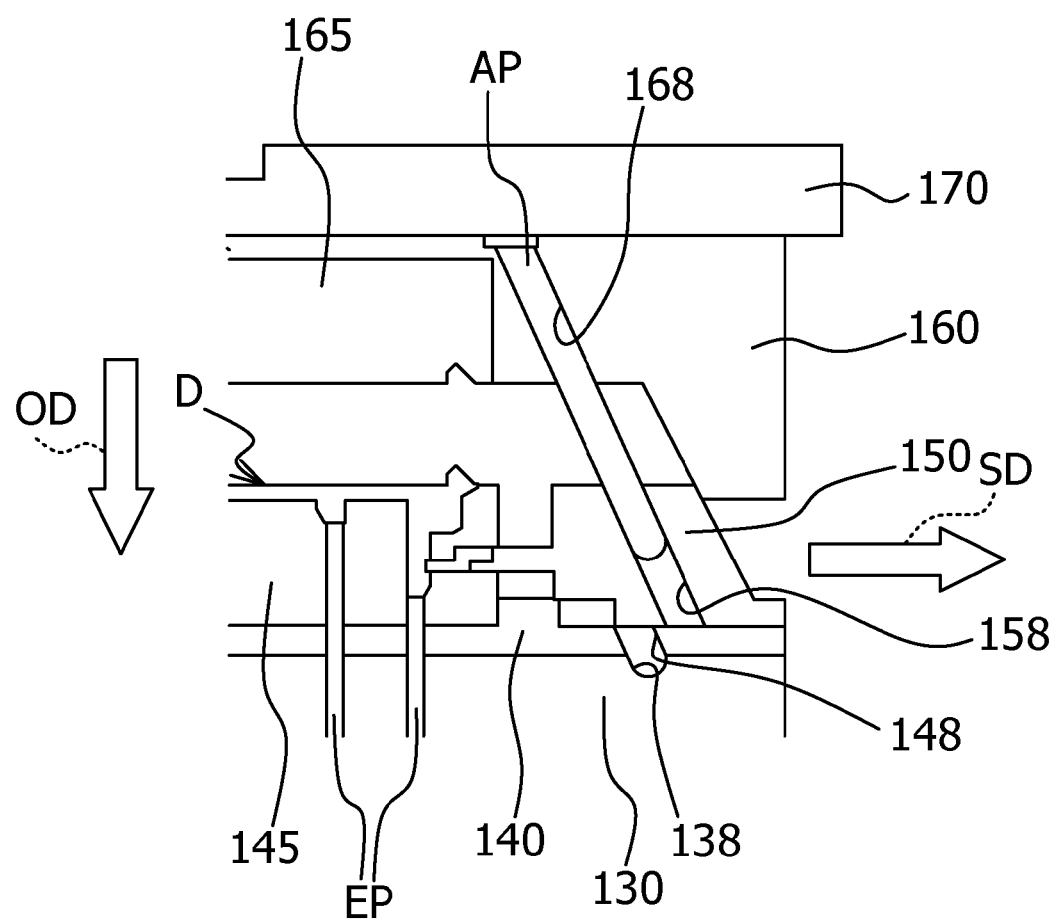
FIG. 7 illustrates an area around a slide core of the injection molding machine in a closed state.

FIG. 7 illustrates an area around the slide core 150 of the injection molding machine 100 in the open state. When the injection molding machine 100 shifts from the closed state to the open state, the core plate 140 moves in a direction OD. Accordingly, the slide core 150 slides in a slide direction SD such that the slide core 150 moves away from the core insert 145. Although described below in detail, the slide core 150 performs undercut for the molded part D. After the slide core 150 is retracted from the core insert 145, the ejector pins EP knock out the molded part D.

Figure 8:
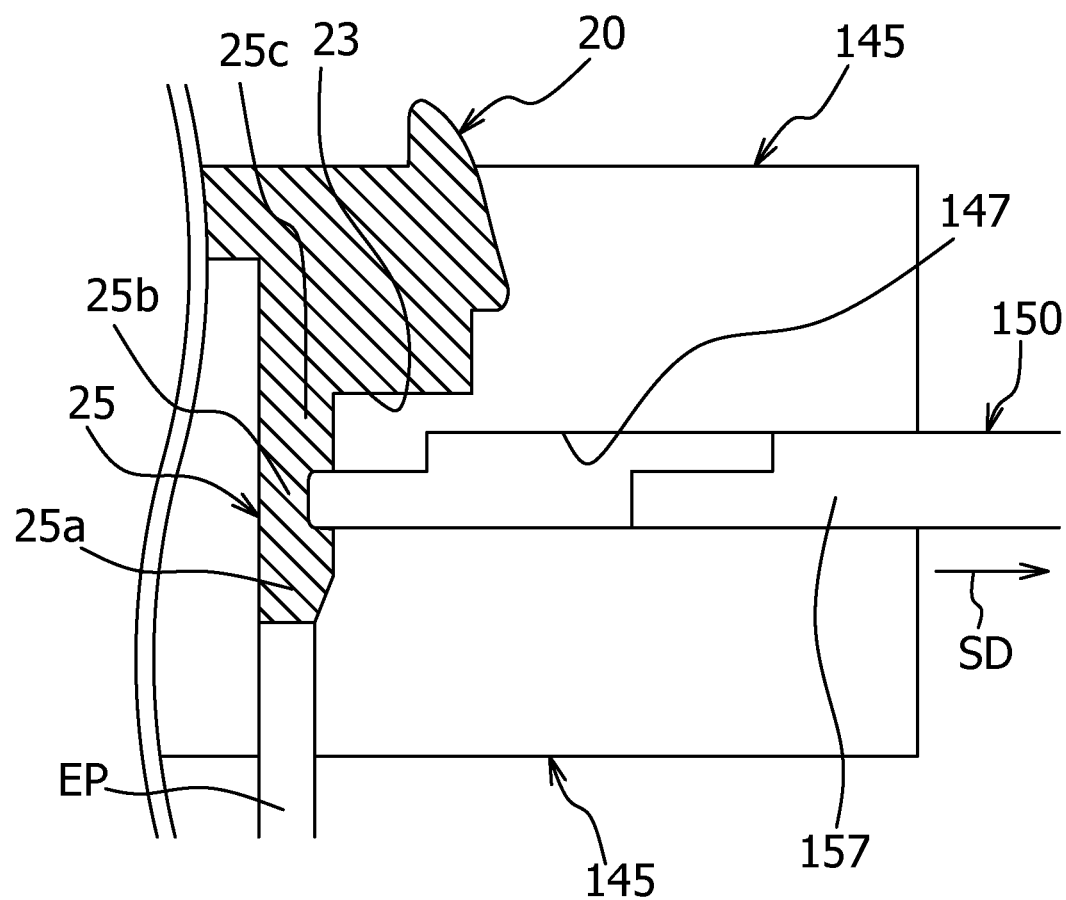
FIG. 8 is a partly enlarged view of FIG. 7.

FIG. 8 is a partly enlarged view of FIG. 7. The core insert 145 has a hole 147. The slide core 150 has a protrusion 157 that is inserted into the hole 147. The protrusion 157 and the core insert 145 define the flange 25a of the engaging portion 25. The core insert 145 defines the pressed portion 23. Thus, the slide core 150 does not make a contribution to defining the pressed portion 23. In other words, the slide core 150 does not contact the pressed portion 23 and is separated from the pressed portion 23. As described above, since the core insert 145 defines the pressed portion 23, the region R of the pressed portion 23 may be flat.

Figure 9:
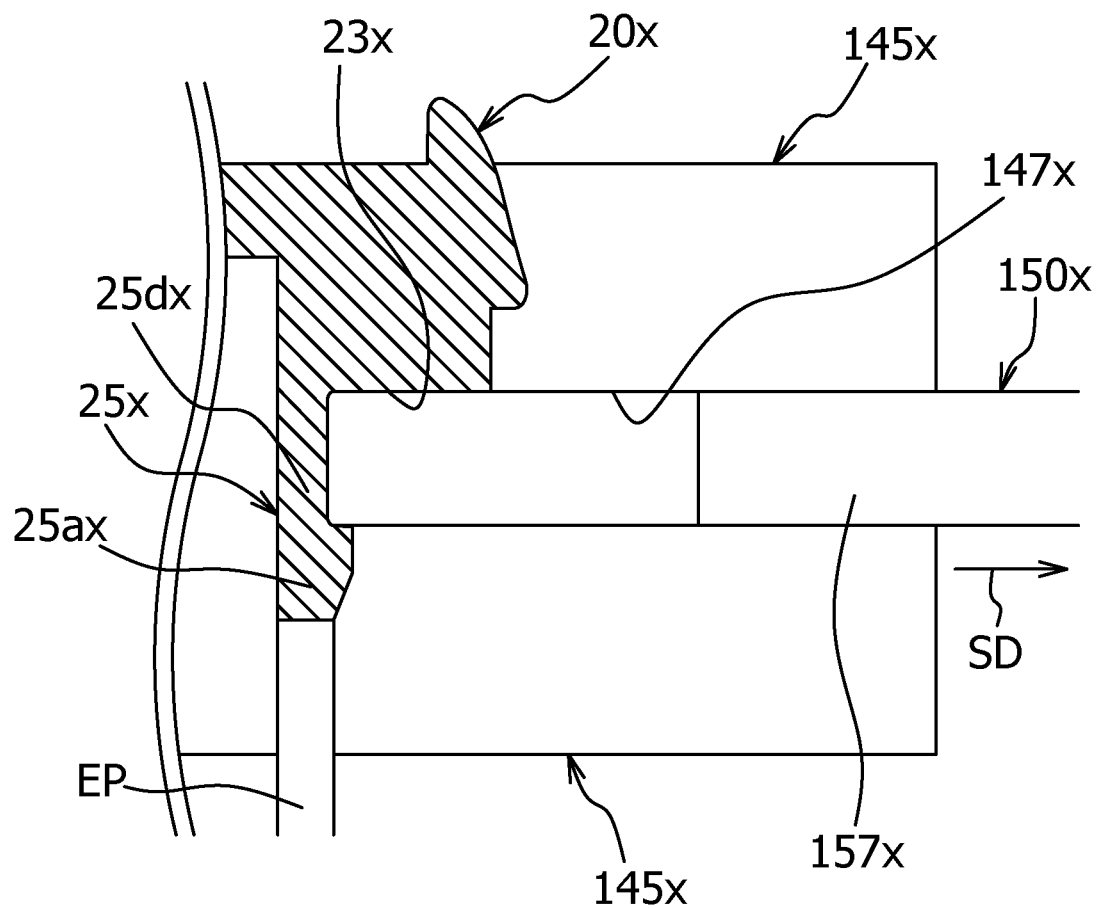
FIG. 9 is an explanatory view of a rear case when the rear case is formed by a method different from the method of the embodiment.

Next, a method for forming a rear case, the method which is different from the method of the embodiment, will be described. FIG. 9 is an explanatory view of the rear case when the rear case is formed by the method different from the method of the embodiment. FIG. 9 corresponds to FIG. 8. A protrusion 157x of a slide core 150x, and a core insert 145x cooperatively define a flange 25ax of a rear case 20x. Also, the protrusion 157x defines part of a pressed portion 23x, and the core insert 145x defines remaining part of the pressed portion 23x.

Figure 10:
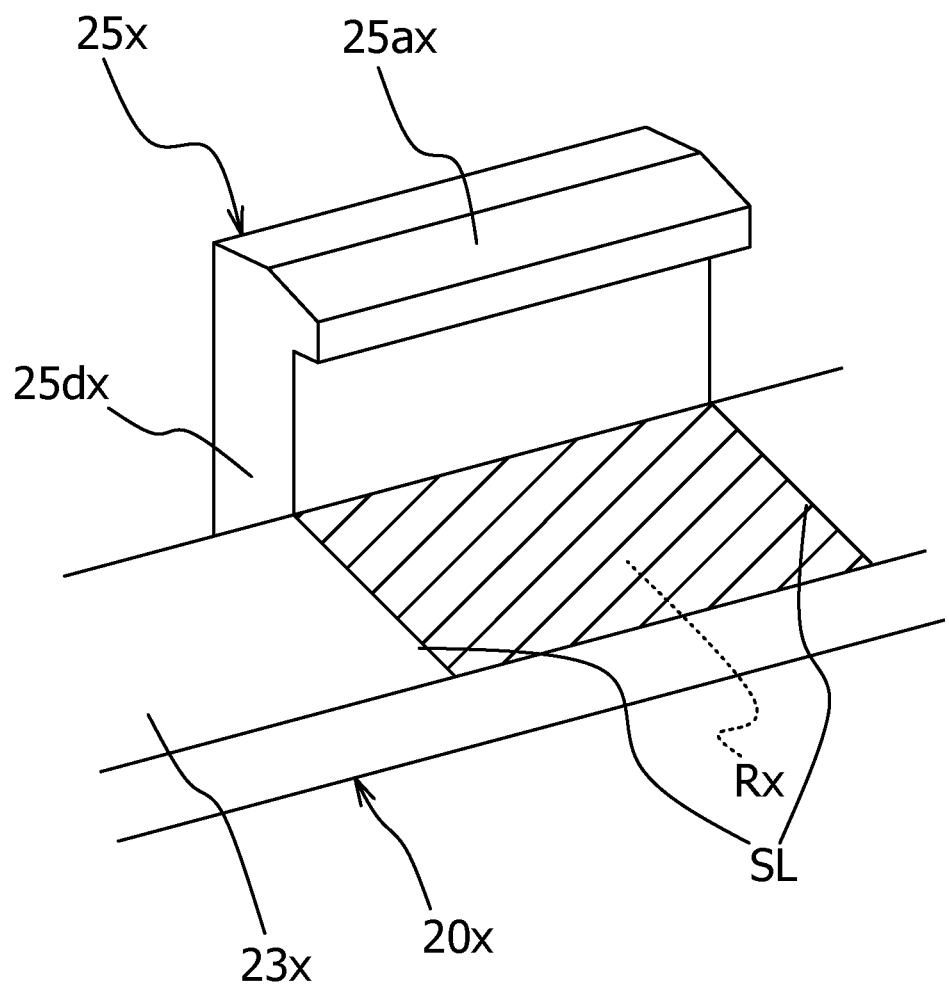
FIG. 10 is a schematic view of an engaging portion of the rear case formed by the method different from the method of the embodiment.

FIG. 10 is a schematic view of an engaging portion 25x of the rear case formed by the method different from the method of the embodiment. Referring to FIG. 10, the pressed portion 23x has steps SL. The protrusion 157x of the slide core 150x defines a region Rx between the two steps SL on the pressed portion 23x. The core insert 145x defines a remaining region other than the region Rx arranged between the steps SL. As described above, the pressed portion 23x includes the region Rx defined by the slide core 150x and the region defined by the core insert 145x. The two steps SL are formed on the pressed portion 23x because a gap is provided between the protrusion 157x and a hole 147x during molding, and the molten resin flows into the gap by a small amount.

Since the steps SL are formed on the pressed portion 23x, when the elastic member presses the pressed portion 23x, the steps may provide a gap between the pressed portion 23x and the elastic member. Water may enter the rear case 20x through the gap.

In contrast, with the forming method according to the embodiment, the pressed portion 23 may be flat. Accordingly, the waterproofness of the casing of the embodiment is increased.

Referring to FIG. 10, the engaging portion 25x includes a flange 25ax and a neck 25dx that continuously extends from the flange 25ax. The neck 25dx has a small thickness even at a base of the engaging portion 25x unlike the engaging portion 25 illustrated in FIG. 5. Thus, the durability of the engaging portion 25x may be reduced. In particular, if an elastic member having a large elastic repulsive force is employed to increase the waterproofness, a large load may be exerted on the engaging portion 25x.

In contrast, regarding the rear case 20 according to the embodiment, the base 25c of the engaging portion 25 has the larger thickness than the neck 25b, thus durability is increased.

The desirable embodiment of the present invention has been described above. However, the present invention is not limited to the embodiment, and may be modified and changed in various forms within the scope of the present invention described in the claims.

The casing of the embodiment may be used for any of a portable apparatus and a stationary apparatus. For example, the casing of the embodiment may be used for an electronic notepad, a personal digital assistant (PDA), a calculator, a clock, a global positioning system (GPS), or a personal computer.

In the embodiment, the core insert 145, the cavity insert 165, and the slide core 150 define the rear case 20. Alternatively, for example, a cavity that is formed between the core plate 140 and the cavity plate 160, and the slide core 150 may define the rear case 20.

The casing of the embodiment may be used for the casing of the display section 3.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. An electrical device A casing comprising: a first casing; a second casing; an elastic member sandwiched between the first casing and the second casing, wherein the first casing includes a pressed portion that is pressed by the elastic member with an entire bottommost surface of the elastic member being in direct contact with the pressed portion, and an engaging portion adjacent to the pressed portion that has a flange protruding toward the pressed portion that engages with the second casing, the engaging portion being within the first casing, the pressed portion is flat in a region corresponding to at least the engaging portion, and wherein a portion of the second casing is located directly between the engaging portion and the elastic member; wherein the engaging portion includes a neck beneath the flange, and a base connected to the neck and the base has a larger thickness than the neck.

2. An electronic apparatus comprising: a first casing; a second casing; an elastic member is sandwiched between the first and second casings; and an electronic component in a housing space defined cooperatively by the first and second casings, wherein the first casing includes a pressed portion that is pressed by the elastic member with an entire bottommost surface of the elastic member being in direct contact with the pressed portion, and an engaging portion adjacent to the pressed portion, that has a flange protruding toward the pressed portion that engages with the second casing, the engaging portion being within the housing space, and the pressed portion is flat in a region corresponding to at least the engaging portion; wherein a portion of the second casing is located directly between the engaging portion and the elastic member; and wherein the engaging portion includes a neck beneath the flange, and a base connected to the neck and the base has a larger thickness than the neck.

3. The electronic apparatus according to claim 2, further comprising:
a first apparatus-configuring section including the first and second casings; and
a second apparatus-configuring section coupled to the first apparatus-configuring section so that the first and second apparatus-configuring sections are openable and closable, and the second apparatus housing a display.

* * * * *